United States Patent
Murray

(10) Patent No.: US 9,277,735 B2
(45) Date of Patent: Mar. 8, 2016

(54) BIRDFEEDER HAVING ONE-TOUCH REMOVABLE BASE

(71) Applicant: John J Murray, Antioch, IL (US)

(72) Inventor: John J Murray, Antioch, IL (US)

(73) Assignee: Akerue Industries, LLC, Antioch, IL (US)

( * ) Notice: Subject to any disclaimer, the term of this patent is extended or adjusted under 35 U.S.C. 154(b) by 100 days.

(21) Appl. No.: 14/260,353

(22) Filed: Apr. 24, 2014

(65) Prior Publication Data

US 2015/0305311 A1    Oct. 29, 2015

(51) Int. Cl.
*A01K 39/01* (2006.01)
*A01K 39/012* (2006.01)

(52) U.S. Cl.
CPC .......... *A01K 39/012* (2013.01); *A01K 39/0113* (2013.01)

(58) Field of Classification Search
CPC ... A01K 39/00; A01K 39/01; A01K 39/0113; A01K 39/012
See application file for complete search history.

(56) References Cited

U.S. PATENT DOCUMENTS

| | | | | |
|---|---|---|---|---|
| 4,646,686 A | * | 3/1987 | Furlani | A01K 39/0113 119/57.9 |
| 4,738,221 A | * | 4/1988 | Nock | A01K 39/026 119/464 |
| 4,829,934 A | * | 5/1989 | Blasbalg | A01K 39/012 119/57.8 |
| RE32,970 E | * | 7/1989 | Furlani | A01K 39/0113 119/52.3 |
| 4,966,098 A | * | 10/1990 | Freeman | A01K 5/0225 119/52.2 |
| 5,207,181 A | * | 5/1993 | Loken | A01K 39/012 119/52.3 |
| 5,215,039 A | * | 6/1993 | Bescherer | A01K 39/012 119/468 |
| 5,413,069 A | * | 5/1995 | Currie | A01K 39/012 119/52.2 |
| 5,720,238 A | * | 2/1998 | Drakos | A01K 39/0113 119/57.9 |
| 5,826,540 A | * | 10/1998 | Bridges | A01K 39/0113 119/52.3 |
| 6,253,707 B1 | * | 7/2001 | Cote | A01K 39/0106 119/57.9 |
| 6,945,192 B2 | * | 9/2005 | Cote | A01K 39/0113 119/57.9 |
| 7,093,561 B2 | * | 8/2006 | Rich | A01K 39/012 119/57.8 |
| 7,198,004 B1 | * | 4/2007 | Lush | A01K 39/012 119/52.2 |

(Continued)

*Primary Examiner* — Kathleen Alker
(74) *Attorney, Agent, or Firm* — Justin Lampel

(57) ABSTRACT

A birdfeeder having a one-touch removable base portion and a stationary upper main body portion is provided. The one-touch removable base portion serves as the bottom of the birdfeeder and may have a generally circular housing wherein a spring tensioned pin moves from a closed First Position A to an open Second Position B within the circular housing of the base portion. The components of the one-touch removable base portion are protected from the outside elements by being located underneath the bottom of the birdfeeder. A first end of the movable pin extends outside the generally circular housing of the base portion and locks the removable base portion housing into the stationary upper main body portion of the birdfeeder. The birdfeeder further has a movable exterior guard which selectively either allows access to a feeding port or blocks access to the feeding port.

15 Claims, 5 Drawing Sheets

(56) References Cited

U.S. PATENT DOCUMENTS

| | | | | |
|---|---|---|---|---|
| 7,302,911 B1 * | 12/2007 | Lush | A01K 39/012 | 119/52.2 |
| 7,621,232 B2 * | 11/2009 | Bescherer | A01K 39/012 | 119/52.2 |
| 7,779,786 B2 * | 8/2010 | Walsh | A01K 39/012 | 119/57.9 |
| 7,946,248 B2 * | 5/2011 | Colwell | A01K 39/012 | 119/57.8 |
| 7,992,520 B2 * | 8/2011 | Lush | A01K 39/0113 | 119/52.3 |
| D648,903 S * | 11/2011 | Lush | D30/127 | |
| 8,056,507 B2 * | 11/2011 | Lush | A01K 39/0113 | 119/57.8 |
| 2004/0031443 A1 * | 2/2004 | Ela | A01K 39/012 | 119/57.9 |
| 2005/0145182 A1 * | 7/2005 | Marshall | A01K 39/012 | 119/57.8 |
| 2005/0211177 A1 * | 9/2005 | Bescherer | A01K 39/012 | 119/57.8 |
| 2006/0016400 A1 * | 1/2006 | Rich | A01K 39/012 | 119/57.8 |
| 2007/0266950 A1 * | 11/2007 | Walsh | A01K 39/012 | 119/57.8 |
| 2010/0192864 A1 * | 8/2010 | Colwell | A01K 39/012 | 119/57.8 |
| 2010/0288200 A1 * | 11/2010 | Lush | A01K 39/012 | 119/52.3 |

* cited by examiner

BIRDFEEDER HAVING ONE-TOUCH REMOVABLE BASE

BACKGROUND OF THE INVENTION

A birdfeeder having a one-touch removable base portion and a stationary upper main body portion is provided. A removable lid is located at the top of the stationary upper main body portion. The one-touch removable base portion serves as the bottom of the birdfeeder and may have a generally circular housing wherein a spring tensioned pin moves from a closed First Position A to an open Second Position B within the circular housing of the base portion. The components of the one-touch removable base portion are protected from the outside elements by being located underneath the bottom of the birdfeeder. Within the removable base housing, a generally cylindrical activation ring surrounds a movable pin and allows a user to move the movable pin from the closed First Position A to the open Second Position B with one hand. A first end of the movable pin extends outside the generally circular housing of the base portion and locks the removable base portion housing into the stationary upper main body portion of the birdfeeder. The birdfeeder further has a movable exterior guard which selectively either allows access to a feeding port or blocks access to the feeding port located on the side of the stationary upper main body portion of the birdfeeder. In an embodiment, the movable exterior guard is cylindrical in shape.

Attempts have been made to provide a birdfeeder which has a removable bottom and/or a feeding port which may be temporarily covered. For example, U.S. Pat. No. 4,646,686 to Furlani discloses a selective bird feeder having a cylindrical, transparent feed container located inside a concentric, coaxial, transparent shroud. The shroud is supported on the container by a spring for movement between a bird feeding position and a position in which heavier birds or animals cause the shroud to block access to the feed. Perches are supported on the shroud adjacent access openings in the shroud and container. Light birds can obtain feed through the openings while heavier ones or animals cannot.

Further, U.S. Pat. No. 6,945,192 to Cote discloses a squirrel proof bird feeder wherein a lower movable shroud which extends about a lower portion of the feed container having feed access openings therein, a spring member biasing the shroud to a position wherein feed container access openings and shroud access openings are substantially aligned while permitting the shroud access opening to move out of alignment with the feed container access opening when a predetermined weight is placed on the shroud. An adjustment is provided for adjusting the weight required to move the shroud.

U.S. Pat. No. 5,678,507 to Kassner discloses a bird feeder having a cylindrical shape which is hung by a loop on the top of a wire which runs through the center of the full length of the feeder. A beveled upper edge on the bottom closure, and spring perches, and no other protruding parts along the full length of the feeder prevent squirrels from securing a position on the feeder. There are no moving parts, and all parts are highly weather resistant.

Still further, U.S. Pat. No. 4,977,859 to Kilham discloses a feed device for birds in which a feed distribution assembly is mounted at the bottom of a feed container. The distribution assembly includes a downwardly outwardly slanted lower wall which forces seed to the inner outside peripheral surfaces of the assembly against an intermediate wall which includes openings therethrough. Such openings are normally partially aligned with similar openings formed in an encircling band about the intermediate wall which band is adjustably rotatable thereon such that the desire rate of feed distribution is dependent on the species to be attracted and the seed size utilized.

However, these birdfeeders fail to provide a birdfeeder with a one-touch removable base. Further, these patents fail to disclose a birdfeeder having a movable exterior guard which selectively either allows a bird access to a feeding port or blocks access to the feeding port by the bird (or other animal) based on weight which is also reliable and easy to use.

SUMMARY OF THE INVENTION

A birdfeeder having a one-touch removable base portion and a stationary upper main body portion is provided. A removable lid is located at the top of the stationary upper main body portion. The one-touch removable base portion serves as the bottom of the birdfeeder and may have a generally circular housing wherein a spring tensioned pin moves from a closed First Position A to an open Second Position B within the circular housing of the base portion. The components of the one-touch removable base portion are protected from the outside elements by being located underneath the bottom of the birdfeeder. Within the removable base housing, a generally cylindrical activation ring surrounds a movable pin and allows a user to move the movable pin from the closed First Position A to the open Second Position B with one hand. A first end of the movable pin extends outside the generally circular housing of the base portion and locks the removable base portion housing into the stationary upper main body portion of the birdfeeder. The birdfeeder further has a movable exterior guard which selectively either allows access to a feeding port or blocks access to the feeding port located on the side of the stationary upper main body portion of the birdfeeder. In an embodiment, the movable exterior guard is cylindrical in shape.

An advantage of the present one-touch removable base for a birdfeeder is that the present birdfeeder allows for the easy removal of a removable base from a stationary upper main body portion of the birdfeeder with one hand, regardless of the size of the base.

And an advantage of the present one-touch birdfeeder is that the present birdfeeder may have a grommet secured to a removable lid of the birdfeeder which prevents rain or other objects from entering the interior of the birdfeeder.

Still another advantage of the present one-touch birdfeeder is that the present one-touch birdfeeder may have a stabilizing bar which keeps the moving parts of the birdfeeder in line and guides an exterior guard as it moves up and down from the First Position to the Second Position.

Yet another advantage of the present one-touch removable base for a birdfeeder is that the present birdfeeder allows for easy cleaning of the interior of the birdfeeder.

And yet another advantage of the present one-touch removable base for a birdfeeder is that the present birdfeeder has a movable exterior guard which either allows a bird to access a feeding port or blocks access to the feeding port for a heavier bird (or other animal).

Still another advantage of the present one-touch removable base birdfeeder is that the present birdfeeder may have a handle section which allows the user to hang the birdfeeder from, for example, a tree or the like.

And another advantage of the present birdfeeder is that the present birdfeeder may be durable so as to withstand prolonged exposure to outside elements.

For a more complete understanding of the above listed features and advantages of the present one-touch removable base birdfeeder, reference should be made to the following detailed description of the preferred embodiments. Further, additional features and advantages of the invention are described in, and will be apparent from, the detailed description of the preferred embodiments.

DETAILED DESCRIPTION OF THE PREFERRED EMBODIMENTS

A birdfeeder having a one-touch removable base portion and a stationary upper main body portion is provided. A removable lid is located at the top of the stationary upper main body portion. The one-touch removable base portion serves as the bottom of the birdfeeder and may have a generally circular housing wherein a spring tensioned pin moves from a closed First Position A to an open Second Position B within the circular housing of the base portion. The components of the one-touch removable base portion are protected from the outside elements by being located underneath the bottom of the birdfeeder. Within the removable base housing, a generally cylindrical activation ring surrounds a movable pin and allows a user to move the movable pin from the closed First Position A to the open Second Position B with one hand. A first end of the movable pin extends outside the generally circular housing of the base portion and locks the removable base portion housing into the stationary upper main body portion of the birdfeeder. The birdfeeder further has a movable exterior guard which selectively either allows access to a feeding port or blocks access to the feeding port located on the side of the stationary upper main body portion of the birdfeeder. In an embodiment, the movable exterior guard is cylindrical in shape.

Figure 1:
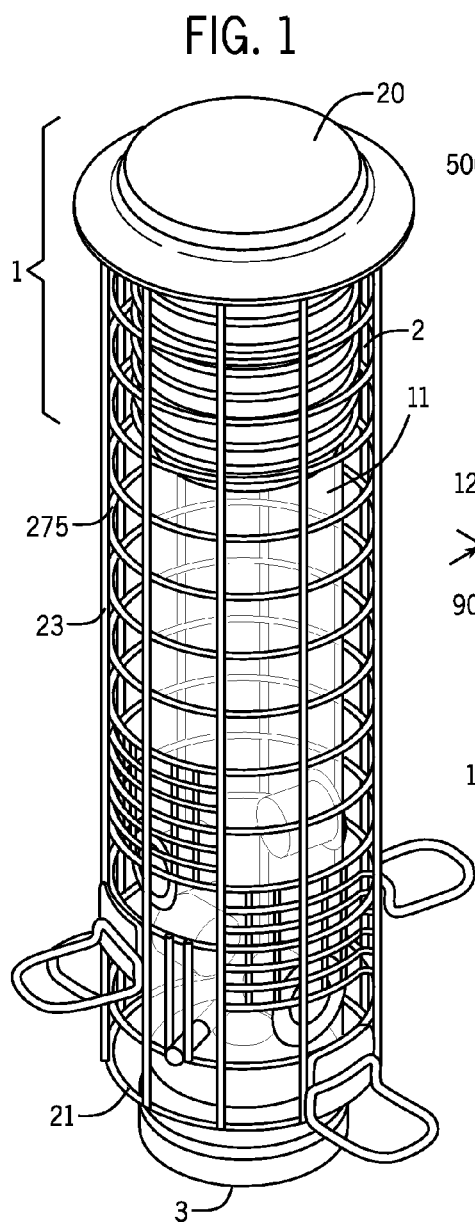
FIG. 1 illustrates a perspective view of the birdfeeder.

Referring now to the drawings wherein like numbers refer to like parts, FIG. 1 generally illustrates a birdfeeder 1 having a stationary upper main body portion 2 and a removable base portion 3. In an embodiment, the stationary upper main body portion 2 of the birdfeeder 1 may be generally cylindrical in shape and made of, for example, a durable plastic, metal or the like so as to be able to withstand prolonged exposure to the outdoor elements. It is understood that the birdfeeder 1 may also be of any shape other than cylindrical. In an embodiment, the stationary upper main body portion 2 may be generally transparent so that birds may visually see bird food 50 (FIG. 5) located within an interior 11 (FIG. 10) of the birdfeeder 1 and further so as to allow a user to see when a refill of the birdfeeder 1 is needed.

Figure 10:
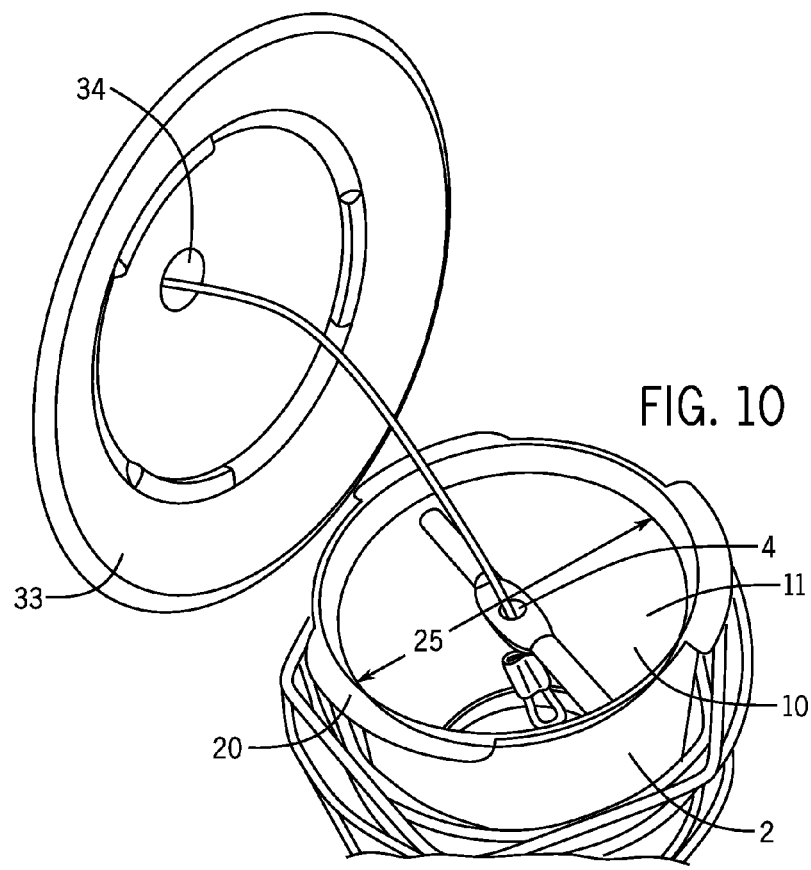
FIG. 10 illustrates a top view of the birdfeeder wherein a removable lid is removed exposing an interior of the birdfeeder.

The stationary upper main body portion 2 of the birdfeeder 1 may have a top end 20, a bottom end 21 and a generally cylindrical side wall 23. An opening 10 (FIG. 10) at the top end 20 of the stationary upper main body portion 2 of the birdfeeder 1 exposes an interior 11 wherein a user may insert bird food 50. More specifically, the bird food 50 is preferably inserted through the opening 10 at the top end 20 of the stationary upper main body portion 2 by removing a removable lid 33 (FIG. 4) of the birdfeeder 1. The opening 10 at the top end 20 of the stationary upper main body portion 2 of the birdfeeder 1 may have a diameter 25 (FIG. 10). Although filling the birdfeeder 1 with bird food 50 through the removable lid 33 at the top end 20 of the birdfeeder 1 is recommended, in an embodiment, an opening is lacking at the top end 20 of the birdfeeder 1 and access to the interior 11 of the birdfeeder 1 may only be obtained through an opening at the bottom end 21 of the birdfeeder 1 when the removable base portion 3 is removed (as discussed below).

Figure 11:
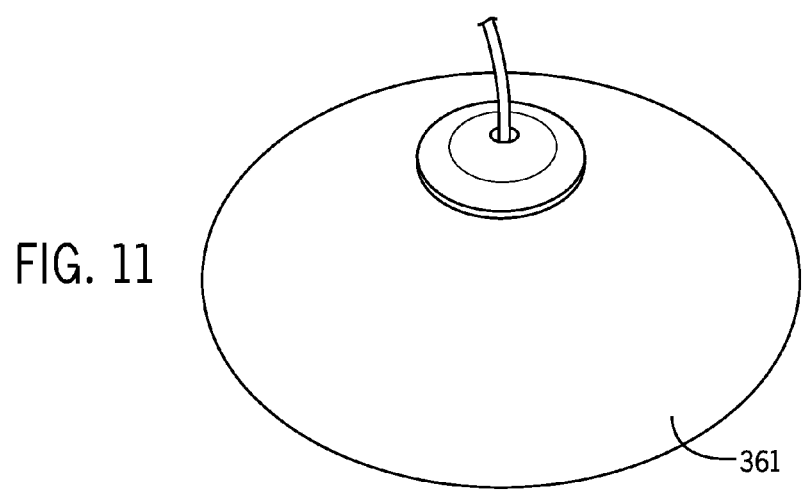
FIG. 11 illustrates a top perspective view of the birdfeeder with the lid attached and a grommet present.
Figure 12:
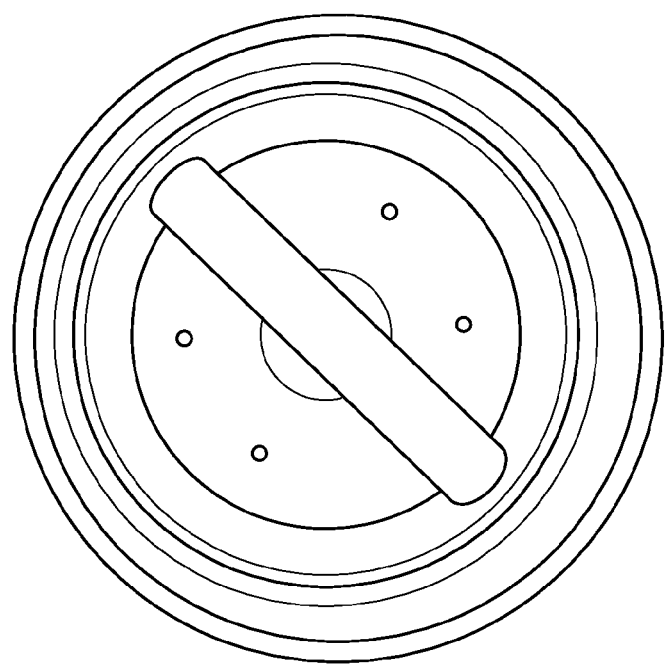
FIG. 12 illustrates a view of the bottom of the birdfeeder when the removable base is secured to the upper main body portion.

In an embodiment, the removable lid 33 (FIG. 4) the top end 20 of the birdfeeder 1 may be removed from the top end 20 of the stationary upper main body portion 2. More specifically, the removable lid 33 at the top end 20 may be removed from the stationary upper main body portion 2 by being unscrewed or twisted off. In an embodiment, a grommet 361 (FIG. 11) may be placed over a portion of the removable lid 33 at the top end 20 of the device 1. Preferably, the grommet 361 is made of plastic, rubber or the like. The grommet 361 may prevent rain water or other material from gaining accessing into the interior 11 of the birdfeeder 1 through an opening 34 (FIG. 10) in the removable lid 33 of the birdfeeder 1.

Figure 2:
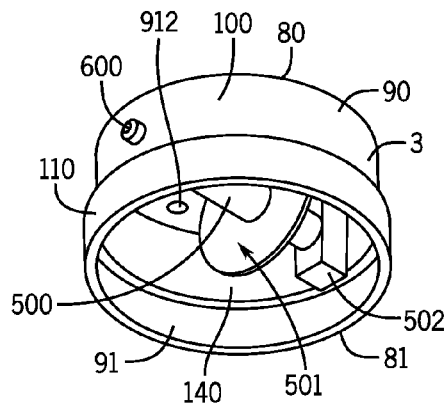
FIG. 2 illustrates a movable pin within a generally cylindrical main body port of a removable bottom of the birdfeeder wherein the movable pin is in the closed First Position A.

Referring now to FIG. 2, in an embodiment, the removable base portion 3 may have a top surface 80, a bottom 81, a generally cylindrical side wall portion 90 and an interior 91. In an embodiment, the top surface 80 may be generally circular and may cover substantially the entire top of the removable base portion 3. The removable base portion 3 may be generally made of a durable plastic, metal or the like. Preferably, the removable base portion 3 is removed from the stationary upper main body portion 2 so that the removable base portion 3 may be properly cleaned and/or so as to allow a user to access the interior 11 of the birdfeeder 1. As stated above, in an alternative embodiment to the removable lid 33, the bird food 50 may be inserted into the interior 11 of the birdfeeder 1 when the removable base portion 3 is removed from the stationary upper main body portion 2 and the birdfeeder 1 is turned upside down. Once the bird food 50 is inside the interior 11 of the birdfeeder 1, the removable base portion 3 may then be reinserted and secured to the stationary upper main body portion 2 of the birdfeeder 1 and the birdfeeder 1 may then be turned upright and placed in the usable orientation.

As stated above, the removable base portion 3 of the birdfeeder 1 may be removed from the stationary upper main body portion 2 of the birdfeeder 1. Further, the removable base portion 3 may be easily removed with one hand. The removable base portion 3 may have a circular main body port 100 (FIG. 2) and an opening 140 which exposes an interior 91 of the removable base portion 3. The circular main body port 100 (and, therefore, the removable base portion 3) may be located at the bottom end 21 of the stationary upper main body portion 2 and may function as the general bottom of the birdfeeder 1 therein preventing bird food 50 from falling out of the birdfeeder 1. Locating the opening 140 of the circular main body port 100 on the very bottom of the birdfeeder 1 may prevent a movable pin 500 and activation ring 501 (as described below) from becoming damaged over time by extended exposure to the outside elements or accidentally activated.

In an embodiment, the circular main body port 100 may have an extended ridge portion 110. The extended ridge portion 110 may be generally cylindrical; having a diameter 111 slightly greater than a diameter 115 of the circular main body port 100. The extended ridge portion 110 may provide extended protection so that the movable pin 500 and activation ring 501 is are not accidentally activated by being accidentally contacted. More specifically, if the movable pin 500 and activation ring 501 is are accidentally activated (ie: moved into the open Second Position B in FIG. 3) while the birdfeeder 1 is in the upright position, the bird food 50 would fall out of the birdfeeder 1 and would be wasted. Further, the extended ridge portion 110 may reduce exposure of the elements to the movable pin 500 and activation ring 501 therein reducing rusting or other possible damage caused by prolonged exposure to the outdoor elements. Finally, the extended ridge portion 110 may align with and contact the bottom end 21 of the stationary upper main body portion 2 (while the main body port 100 slides within the interior 11 of the stationary upper main body portion 2) therein allowing the movable pin 500 to be properly aligned with the stationary upper main body portion 2 (as described below).

The generally circular side wall portion 90 of the cylindrical main body port 100 may have an opening 120 (FIG. 3) having a diameter 121. The opening 120 may allow a first end 600 (FIG. 2) of the movable pin 500 to partially pass through the generally circular side wall portion 90 therein allowing the movable pin 500 to move from the closed First Position A to the open Second Position B.

A second opening 225 (FIGS. 4 and 6) may be located on the bottom portion of the stationary upper main body portion 2 of the birdfeeder 1. The second opening 225 may have a diameter substantially equal to the diameter 121 of the opening 120 on the generally circular side wall portion 90 of the generally cylindrical main body port 100.

When the birdfeeder 1 is in the usable upright position, the first end 600 of the movable pin 500 not only extends partially through the opening 120 of the side wall 90 of the main body port 100, but the first end 600 of the movable pin 500 also partially extends though the second opening 225 of the stationary upper main body portion 2. As a result, the removable base portion 3 is locked into the stationary upper main body portion 2 when the birdfeeder 1 is being used.

Figure 8:
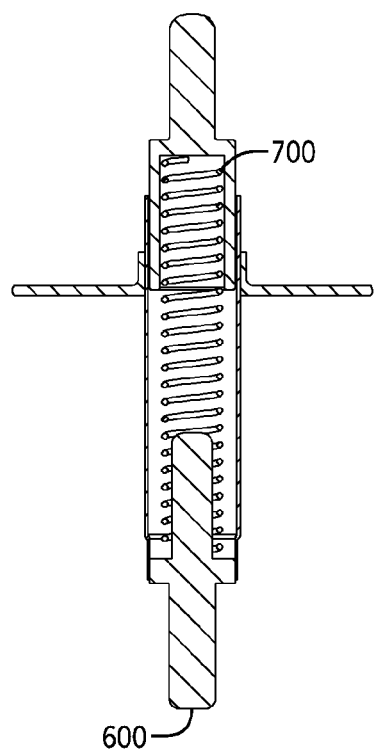
FIG. 8 illustrates a cut-away view of the movable pin and activation ring of the present birdfeeder.
Figure 9:
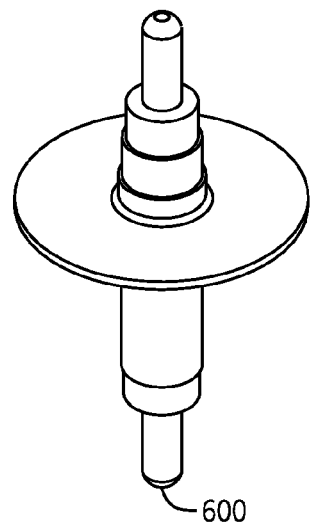
FIG. 9 illustrates a perspective view of the movable pin and activation ring of the present birdfeeder.

A spring 700 (FIG. 8) may be located within the interior 91 of the circular main body port 100. More specifically, the spring 700 may be located within the movable pin 500 and may allow the movable pin 500 to expand or contract. The spring 700 may provide pressure to force the first end 600 of the movable pin 500 into the opening 120 of the circular main body port 100 and further into the second opening 225 of the stationary upper main body portion 2 (therein locking the removable base 3 to the stationary upper main body portion 2). When the first end 600 of the movable pin 500 is located partially within the opening 120, the birdfeeder 1 is in the closed First Position A (FIG. 2) and the removable base portion 3 cannot be removed from the stationary upper main body portion 2 of the birdfeeder 1.

To remove the removable base portion 3 from the stationary upper main body portion 2, a user applies pressure on the activation ring 501 (which is permanently secured to the movable pin 500) to overcome the pressure of the spring 700 located within the movable pin 500. When this happens, the first end 600 of the movable pin 500 moves away from and no longer occupies the opening 120 of the circular main body port 100 or the second opening 225 of the stationary upper main body portion 2. In this tension filled Second Position B (FIG. 3), the removable base portion 3 may be removed from the stationary upper main body portion 2 of the birdfeeder 1. To reinstall the removable base portion 3 to the stationary upper main body portion 2, a user simply reverses the process by applying pressure to the activation ring 501, aligning the movable pin 500 toward the opening 120 of the housing and second opening 225 of the stationary upper main body portion 2 and releasing the pressure of the spring 700 so that the first end 600 of the movable pin 500 again partially occupies the opening 120 of the main body port 100 and the second opening 225 of the stationary upper main body portion 2.

Figure 3:
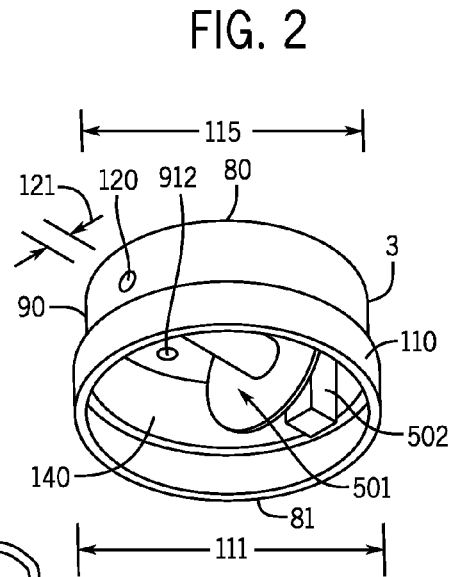
FIG. 3 illustrates the movable pin within the generally cylindrical main body port of the removable bottom wherein the movable pin is in the open Second Position B.

In an embodiment, the movable pin 500 is prevented from traveling by a stop 502 (FIG. 3). More specifically, the stop 502 may provide a start point and an end point wherein the activation ring 501 (and therefor movable pin 500) may travel. As a result, the activation ring 501 and movable pin 500 move in a predetermined limited manner.

Figure 6:
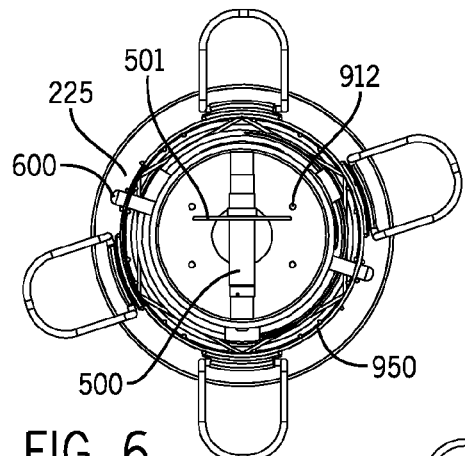
FIG. 6 illustrates a view of the bottom of the birdfeeder wherein the removable base is secured to the birdfeeder.
Figure 7:
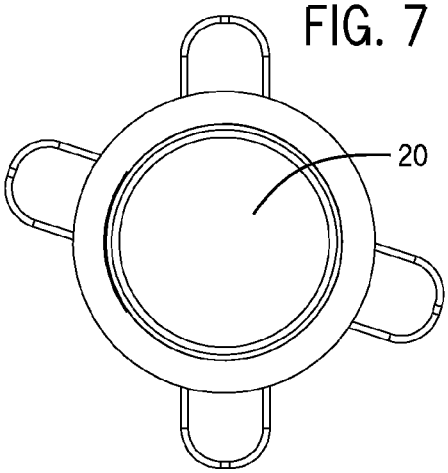
FIG. 7 illustrates a view of the top of the birdfeeder.

Referring now to FIGS. 3 and 6, in an embodiment, a plurality of drain holes 912 may be located on the top surface 80 of the removable base portion 3. The plurality of drain holes 912 may be large enough so as to allow water to escape from the interior 11 of the stationary main body section 2 through the drain holes 912 of the removable base portion 3 while still being small enough so that it is difficult for bird food 50 to escape through the drain holes 912.

In an embodiment, the birdfeeder 1 may have a generally movable exterior guard 275 (FIG. 1). The movable exterior guard 275 may have a diameter 280 (FIG. 5) which is slightly greater than the diameter of the opening 10 at the top end 20 of the stationary upper main body portion 2 of the birdfeeder 1 (or the bottom end 21 of the birdfeeder 1 when the removable base portion 3 is removed). In particular, the generally movable exterior guard 275 may largely surround the stationary upper main body portion 2 of the birdfeeder 1 and may move with respect to the same. The movable exterior guard 275 may move from a First Position A (FIG. 4) with respect to the stationary upper main body portion 2 to a Second Position B (FIG. 5) with respect to the stationary upper main body portion 2. The movable exterior guard 275 may move from the First Position A to the Second Position B so as to temporarily cover a plurality of openings 300 wherein birds feed.

Figures 4, 5:
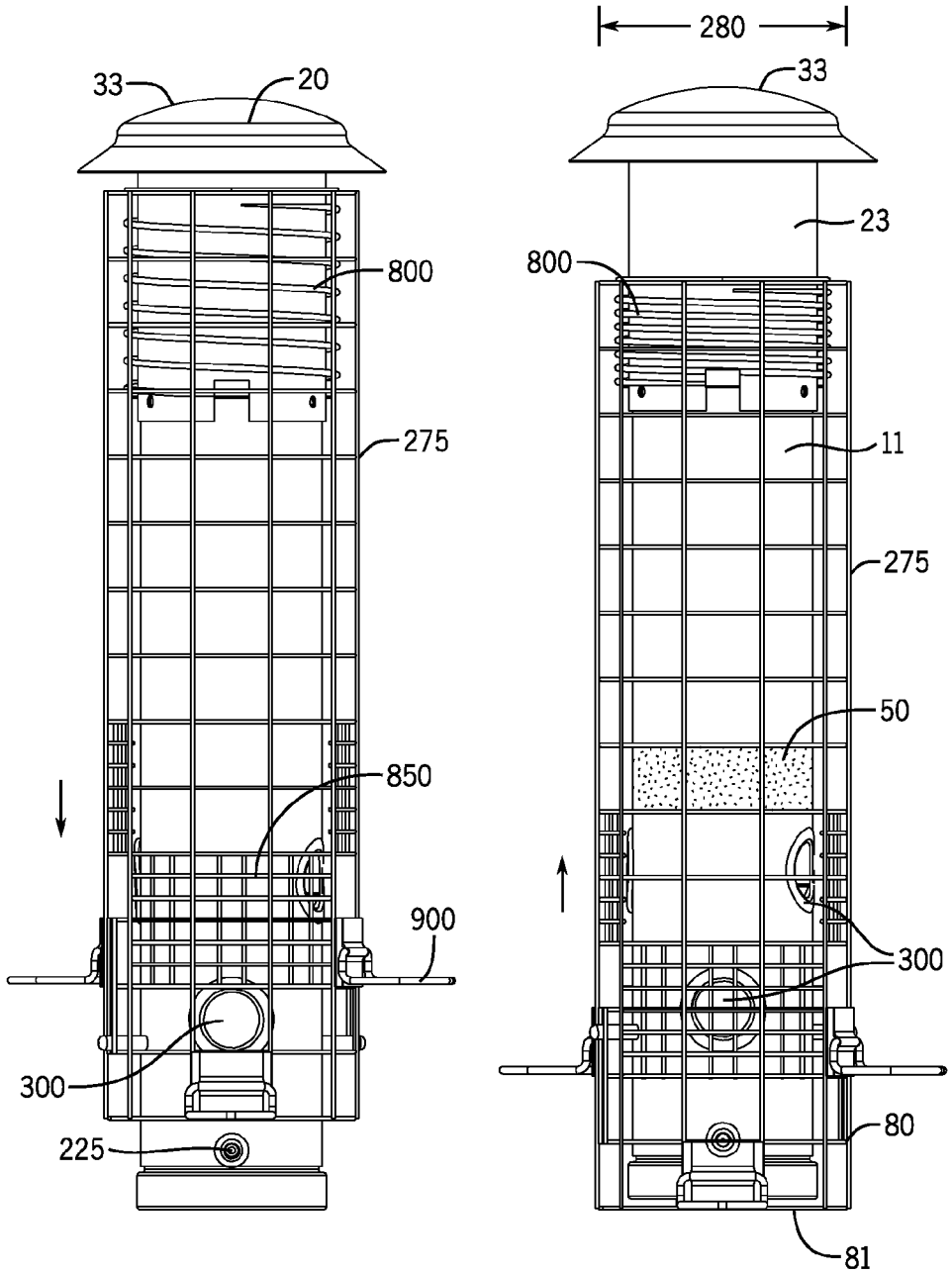
FIG. 4 illustrates a side view of the birdfeeder wherein the movable exterior guard is in the open First Position A.
FIG. 5 illustrates a side view of the birdfeeder wherein the movable exterior guard is in the closed Second Position B.

The plurality of feeding port openings 300 may be located along the side wall 23 of the stationary upper main body portion 2 of the birdfeeder 1. The feeding port openings 300 may allow a bird to access the bird food 50 located within the interior 11 of the stationary upper main body portion 2. A spring 800 may be located near the top end 20 of the stationary upper main body portion 2. The spring 800 may be secured to both the stationary upper main body portion 2 of the birdfeeder 1 and the movable exterior guard 275. In the relaxed state (FIG. 4) the spring 800 is not compressed. FIG. 5 illustrates the spring 800 in the compressed state.

A plurality of movable perches 900 may be secured to the movable exterior guard 275. Preferably, the perches 900 are located near the bottom of the movable exterior guard 275. In an embodiment, as a heavier bird (or other animals such as squirrels) lands on the movable perch 900, the weight of the heavier bird forces the movable exterior guard 275 downward and compresses the spring 800. As the exterior guard 275 moves downward, not only does the movable perch 900 move away from the feeding port opening 300 making it harder for a bird to reach the feeding port 300, but a screen 850 may also cover the feeding port openings 300. As a result, heavier birds (or other animals) may not feed from the birdfeeder 1 while lighter birds may feed.

In an embodiment, the plurality of movable perches 900 may be staggered around the exterior guard 275. For example, the figures illustrate four movable perches 900 located around the exterior guard 275. The movable perches 900 may be unevenly located around the exterior guard 275 such that a gap 950 (FIG. 6) allows a user to access the first end 600 of the movable pin 500 more easily. The movable perches 900 may also be staggered so as to better balance the birdfeeder 1 with or without birds feeding and also may be staggered so that multiple birds have room to feed.

Figure 13:
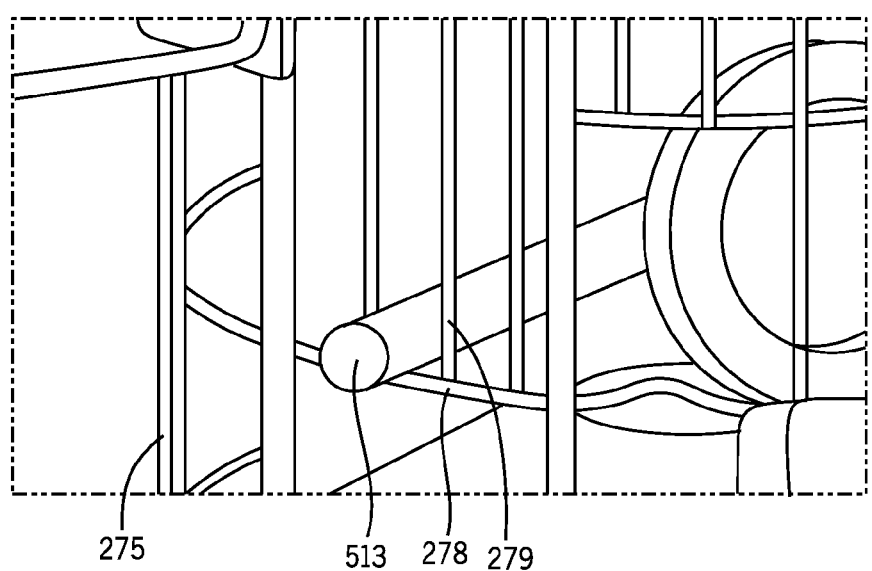
FIG. 13 illustrates a view of the birdfeeder wherein a stabilizing bar is present.

Referring now to FIG. 13, in an embodiment, the birdfeeder 1 may have a stabilizing bar 513 which keeps the movable guard 275 properly oriented and prevents the movable guard 275 from traveling beyond a predetermined range. More specifically, the stabilizing bar 513 may be secured directly to the stationary upper main body section 2 and may prevent the movable guard 275 from rotating with respect to the stationary main body portion 2 as a result of being secured between vertical bars 279 of the movable guard 275. Further, the stabilizing bar 513 may prevent the movable guard 275 from vertically traveling beyond a predetermined location as a result of horizontal bars 278 of the movable guard 275.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A birdfeeder having a removable base comprising:
a first unit forming a top housing wherein the top housing has a top, a bottom, a side and a generally hollow interior;
a second unit forming the removable base wherein the removable base has a top, a bottom, a side and an interior portion;
a movable pin partially located within the interior portion of the removable base wherein the movable pin has a first side and a second side and wherein the movable pin moves from a closed first position to an open second position;
a first opening on the side of the removable base wherein the opening receives a portion of the first side of the removable pin when the movable pin is in the closed first position;
wherein the top of the removable base is temporarily secured to the bottom of the top housing when the movable pin is in the closed first position;
a generally cylindrical guard having a circumference wherein the generally cylindrical guard surrounds the top housing wherein the generally cylindrical guard moves from a first position to a second position; and
a generally circular solid extension ring secured to the movable pin between the first side and the second side of the movable pin and wherein the generally circular solid extension ring acts as a grasping element allowing a user to move the movable pin from the closed first position to the open second position and wherein the generally circular solid extension ring surrounds the movable pin in a generally perpendicular manner with respect to the movable pin.

2. The birdfeeder having a removable base of claim 1 wherein the top housing is substantially transparent.

3. The birdfeeder having a removable base of claim 1 wherein the top housing and the removable base are cylindrical and wherein the top housing has a diameter and wherein the removable base has a diameter.

4. The birdfeeder having a removable base of claim 1 further comprising:
a plurality of openings located on the top of the removable base wherein the plurality of openings allows moisture and water from within the interior of the top housing to exit the top housing through the plurality of openings of the removable base portion when the removable base portion is secured to the top housing.

5. The birdfeeder having a removable base of claim 1 further comprising:
an opening located on the side of the top housing wherein the opening on the side of the top housing is substantially similar in size as the first opening of the side of the removable base and therein the first side of the movable pin partially extends through the first opening of the side of the removable base and also the opening of the side of the top portion to temporarily secure the removable base to the top housing.

6. The birdfeeder having a removable base of claim 1 further comprising:
a spring located partially within an interior of the movable pin wherein the spring forces the movable pin into the closed first position in a relaxed state and wherein the spring of the movable pin may be compressed therein allowing the movable pin to move into the open second position.

7. The birdfeeder having a removable base of claim 1 further comprising:
a first exterior side of the removable base wherein the first exterior side has a diameter;
a second exterior side of the removable base wherein the second exterior side has a diameter; and
wherein the diameter of the first exterior side of the removable base is less than the diameter of the second exterior side of the removable base.

8. The birdfeeder having a removable base of claim 7 wherein the diameter of the second exterior side of the removable base is substantially equal to a diameter of the top housing such that the second exterior side of the removable base is secured to the top housing while the first exterior side of the removable base is located within the interior of the top housing.

9. The birdfeeder having a removable base of claim 1 further comprising:
a removable lid on the top of the top housing wherein the removable lid has an opening in the center of the removable lid and wherein a grommet partially surrounds the opening of the removable lid.

10. The birdfeeder having a removable base of claim 1 further comprising:
a plurality of perches for a bird located on the generally cylindrical guard wherein the plurality of perches are unevenly spaced around the circumference of the generally cylindrical guard to create a gap for accessing the movable pin of the removable base.

11. A birdfeeder having a removable base comprising:
- a first unit forming a top housing wherein the top housing has a top, a bottom, a generally cylindrical side having a diameter and a generally hollow interior wherein a bird food may be placed within the generally hollow interior;
- a second unit forming the base wherein the base has a top, a bottom, a generally cylindrical side and an interior portion;
- wherein the top of the base is temporarily secured to the bottom of the top housing;
- an opening forming a feed port on the generally cylindrical side of the top housing wherein the feed port allows access to the bird food stored within the generally hollow interior;
- a generally cylindrical guard having an interior and having a diameter which is greater than the diameter of the generally cylindrical side wherein the generally cylindrical guard moves from a first position to a second position;
- a perch for a bird located on the generally cylindrical guard;
- a spring having a first end and a second end wherein the first end of the spring is secured to the top of the top housing and wherein the second end of the spring is secured to the generally cylindrical guard and wherein the spring allows the generally cylindrical guard to move from the first position to the second position; and
- wherein the spring is located completely within the interior of the generally cylindrical guard and located completely outside of the generally cylindrical side of the top housing and further wherein the spring surrounds the generally cylindrical side of the top housing and wherein the generally cylindrical side of the top housing has a uniform circumference along its entire length.

12. The birdfeeder having a removable base of claim 11 wherein a predetermined weight of an animal on the perch forces the generally cylindrical guard to move from the first position to the second position.

13. The birdfeeder having a removable base of claim 11 wherein the generally cylindrical guard has a plurality of vertical bars and horizontal bars which intersect at approximately a ninety degree angle.

14. The birdfeeder having a removable base of claim 13 further comprising:
- a blocking area on the generally cylindrical guard wherein the blocking area contains additional horizontal or vertical bars compared to the remainder of the generally cylindrical guard and wherein the blocking area is located directly above a perch and wherein the blocking area covers the feed port of the top housing when the generally cylindrical guard moves to the second position as a result of an animal having a greater than predetermined weight resting on the perch.

15. The birdfeeder having a removable base of claim 11 further comprising:
- a movable pin partially located within an interior portion of the removable base wherein the movable pin has a first side and a second side and wherein the movable pin moves from a closed first position to an open second position; and
- a generally circular solid extension ring secured to the movable pin between the first side and the second side of the movable pin and wherein the generally circular solid extension ring acts as a grasping element allowing a user to move the movable pin from the closed first position to the open second position and wherein the generally circular solid extension ring surrounds the movable pin in a generally perpendicular manner with respect to the movable pin.

* * * * *